(12) United States Patent
Moore et al.

(10) Patent No.: US 7,689,877 B2
(45) Date of Patent: Mar. 30, 2010

(54) METHOD AND SYSTEM USING CHECKSUMS TO REPAIR DATA

(75) Inventors: William H. Moore, Fremont, CA (US); Jeffrey S. Bonwick, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 813 days.

(21) Appl. No.: 11/406,756

(22) Filed: Apr. 19, 2006

(65) Prior Publication Data
US 2007/0106925 A1    May 10, 2007

Related U.S. Application Data

(60) Provisional application No. 60/733,405, filed on Nov. 4, 2005.

(51) Int. Cl.
*G11C 29/42* (2006.01)
*G11C 29/50* (2006.01)

(52) U.S. Cl. ..................... 714/710; 714/770

(58) Field of Classification Search ............... None
See application file for complete search history.

(56) References Cited

U.S. PATENT DOCUMENTS

| | | |
|---|---|---|
| 4,144,522 A | 3/1979 | Kageyama et al. |
| 5,129,085 A | 7/1992 | Yamasaki et al. |
| 5,155,847 A | 10/1992 | Kirouac et al. |
| 5,371,885 A | 12/1994 | Letwin |
| 5,403,639 A | 4/1995 | Belsan et al. |
| 5,410,667 A | 4/1995 | Belsan et al. |
| 5,675,802 A | 10/1997 | Allen et al. |
| 5,809,516 A * | 9/1998 | Ukai et al. .................. 711/114 |
| 5,819,292 A | 10/1998 | Hitz et al. |
| 5,996,047 A * | 11/1999 | Peacock ..................... 711/118 |
| 6,192,471 B1 | 2/2001 | Pearce et al. .................... 713/2 |
| 6,209,111 B1 | 3/2001 | Kadyk et al. |
| 6,341,341 B1 | 1/2002 | Grummon et al. |
| 6,539,518 B1 * | 3/2003 | Fang et al. .................. 714/805 |
| 6,728,922 B1 * | 4/2004 | Sundaram et al. ........... 714/769 |
| 6,745,284 B1 | 6/2004 | Lee et al. |
| 6,745,305 B2 | 6/2004 | McDowell |

(Continued)

OTHER PUBLICATIONS

Sandberg, R. et al.; "Design and Implementation of the Sun Network Filesystem"; Sun Microsystems, Inc., 1985 USENIX Conference (12 pages).

(Continued)

*Primary Examiner*—Kevin L Ellis
*Assistant Examiner*—Dipakkumar Gandhi
(74) *Attorney, Agent, or Firm*—Osha • Liang LLP

(57) ABSTRACT

A method for reconstructing corrupted data, which includes determining a number of non-parity disks (n), selecting a first combination of n-1 non-parity disks, obtaining a first set of physical blocks from the first combination of n-1 non-parity disks, obtaining a parity block associated with the first set of physical blocks, reconstructing a first physical block using the first set of physical blocks and the parity block, combining the first physical block and the first set of physical blocks to obtain a first reconstructed logical block, checksuming the first reconstructed logical block to obtain a first calculated checksum, and determining whether the first calculated checksum is equal to a stored checksum associated with the first reconstructed logical block.

16 Claims, 8 Drawing Sheets

U.S. PATENT DOCUMENTS

| | | | |
|---|---|---|---|
| 6,795,966 | B1 | 9/2004 | Lim et al. |
| 6,829,617 | B2 | 12/2004 | Sawdon et al. |
| 6,851,082 | B1* | 2/2005 | Corbett .................. 714/770 |
| 6,857,001 | B2 | 2/2005 | Hitz et al. |
| 6,892,211 | B2 | 5/2005 | Hitz et al. |
| 6,910,178 | B1 | 6/2005 | Kiselev et al. .............. 714/819 |
| 6,952,797 | B1* | 10/2005 | Kahn et al. ................. 714/770 |
| 7,007,196 | B2 | 2/2006 | Lee et al. |
| 7,032,154 | B2 | 4/2006 | Kidorf et al. |
| 7,043,677 | B1 | 5/2006 | Li |
| 7,133,964 | B2 | 11/2006 | Rodrigues et al. |
| 7,162,486 | B2 | 1/2007 | Patel et al. |
| 7,174,352 | B2 | 2/2007 | Kleiman et al. |
| 7,200,715 | B2 | 4/2007 | Kleiman et al. |
| 2002/0004883 | A1 | 1/2002 | Nguyen et al. |
| 2002/0055942 | A1 | 5/2002 | Reynolds |
| 2002/0087788 | A1 | 7/2002 | Morris |
| 2002/0161972 | A1 | 10/2002 | Talagala et al. |
| 2003/0033477 | A1 | 2/2003 | Johnson et al. |
| 2003/0126107 | A1 | 7/2003 | Yamagami |
| 2003/0145167 | A1 | 7/2003 | Tomita |
| 2004/0098720 | A1 | 5/2004 | Hooper |
| 2004/0107314 | A1 | 6/2004 | Kim et al. |
| 2004/0123063 | A1 | 6/2004 | Dalal et al. |
| 2004/0225834 | A1 | 11/2004 | Lu et al. |
| 2004/0234000 | A1 | 11/2004 | Page |
| 2005/0010620 | A1 | 1/2005 | Silvers et al. |
| 2005/0097270 | A1 | 5/2005 | Kleiman et al. |
| 2005/0235154 | A1 | 10/2005 | Serret-Avila |
| 2006/0168409 | A1 | 7/2006 | Kahn et al. |
| 2006/0218644 | A1 | 9/2006 | Niles et al. |
| 2006/0256965 | A1 | 11/2006 | Rowe |

OTHER PUBLICATIONS

McKusick, M. K. et al.; "A Fast File System for UNIX"; ACM Transaction on Computer Systems, vol. 2, No. 3, Aug. 1984, pp. 181-197 (17 pages).

Astrahan, M.M. et al.; "System R: Relational Approach to Database Management"; ACM Transactions on Database Systems, vol. 1, No. 2, Jun. 1976, pp. 97-137 (41 pages).

"VERITAS File System 3.4 Administrator's Guide" VERITAS Software Corporation, Nov. 2000, http://www.veritas.com; pp. 1-227 (227 pages).

Czezatke C. et al.; "Linlogfs: A Log-Structured Filesystem for Linux"; The USENIX Association, Proceedings of FREENIX Track: 2000 USENIX Annual Technical Conference, San Diego, California, Jun. 18-23, 2000 (13 pages).

Osorio, N. et al.; "Guidelines for Using Snapshot Storage Systems for Oracle Databases"; Oracle Corporation, Oct. 2001 (13 pages).

Quinlan, S.; "A Cached WORM File System"; AT&T Bell Laboratories, Murry Hill, New Jersey; Software-Practice and Experience, vol. 21(12), pp. 1289-1299, Dec. 1991 (11 pages).

Sun StorEdge Instant Image 2.0 System Administrator's Guide; Sun Microsystems, Inc., Feb. 2000, Revision A (106 pages).

Ylonen, T.; "Concurrent Shadow Paging: A New Direction for Database Research"; Laboratory of Information Processing Science, Helsinki University of Technology, SF-02150, Espoo, Finland, 1992 (8 pages).

Popek, G. et al.; "The LOCUS Distributed System Architecture"; The MIT Press, Cambridge, Massachusetts, 1985 The Massachusetts Institute of Technology (8 pages).

Gray, J. et al.; "The Recovery Manager of the System R Database Manager"; Computing Surveys, vol. 13, No. 2, Jun. 1981 (20 pages).

Schilling, J.; "Enrwurf und Implementierung eines schnellen Filesystems fur Unix unter besonderer Berucksichtigung der technischen Parameter optischer Speichermedien und multimedialer Anwendungen"; Diplomarbeir Jorg Schilling, eingereicht am May 23, 1991 an der TU Berlin, and English Translation (245 pages).

Ylonen, T.; "Concurrent Shadow Paging: Snapshots, Read-Only Transactions, and On-The-Fly Multi-Level Incremental Dumping"; Laboratory of Information Processing Science, Helsinki University of Technology, FIN-02150, Espoo, Finland, 1993 (22 pages).

"The Enterprise Challenge Served by Snapshot"; Whitepaper, 2001 LSI Logic Corporation (8 pages).

Agrawal, R. et al.; "Integrated Concurrency Control and Recovery Mechanisms: Design and Performance Evaluation"; ACM Transactions on Database Systems, vol. 10, No. 4, Dec. 1985, pp. 529-564 (36 pages).

Suresh, Babu S.; "Persistent Snapshots"; Department of Computer Science and Automation, Indian Institute of Science, Bangalore—560 012, Jan. 2000 (38 pages).

"Proceedings of the 5th Annual Linux Showcase & Conference" USENIX Association, Oakland, California, Nov. 5-10, 2001 (11 pages).

Borg, A. et al.; "Fault Tolerance Under UNIX"; ACM Transactions on Computer Systems, vol. 7, No. 1, Feb. 1989, pp. 1-24 (24 pages).

Rosenblum, M. et al.; "The Design and Implementation of a Log-Structured File System"; Electrical Engineering and Computer Sciences, Computer Science Division, Univeristy of California, 1991 (15 pages).

Hecht, M. S. et al.; "Shadowed Management of Free Disk Pages with a Linked List"; ACM Transactions on Database Systems, vol. 8, No. 4, Dec. 1983, pp. 503-514 (12 pages).

Rosenblum, M. et al.; "The LFS Storage Manager" Computer Science Division, Electrical Engineering and Computer Sciences, University of California; presented at the Summer '90 USENIX Technical Conference, Anaheim, California, Jun. 1990 (16 pages).

Lorie, R. A.; "Physical Integrity in a Large Segmented Database"; ACM Transactions on Database Systems, vol. 2, No. 1, Mar. 1977, pp. 91-104 (14 pages).

Johnson, J. E. et al.; "Overview of the Spiralog File System", Digital Technical Journal, vol. 8, No. 2, 1996, pp. 5-14 (10 pages).

Santry, D. S. et al.; "Deciding When to Forget in the Elephant File System"; 17th ACM Symposium on Operating Systems Principles (SOSP '99), Dec. 1999; pp. 110-123 (14 pages).

Chutani, S. et al., "The Episode File System"; Proceedings of the 1992 USENIX Winter Technical Conference; 1992; (18 pages).

Seltzer, M.L.; "File System Performance and Transaction Support"; University of California at Berkeley, 1992 (131 pages).

Goodheart, B. et al.; "The Magic Garden Explained"; Prentice Hall, pp. 24-25, 29-30, 390-391, 1994 (4 pages).

Austin, B. J.; "A Dynamic Disc Allocation Algorithm Designed to Reduce Fragmentation During File Reloading"; pp. 378-381, 1970 (4 pages).

Stallings, W.; "Computer Organization and Architecture: Designing for Performance"; Prentice Hall, pp. 377-378, 2000 (8 pages).

\* cited by examiner

METHOD AND SYSTEM USING CHECKSUMS TO REPAIR DATA

CROSS-REFERENCE TO RELATED APPLICATIONS

This application claims benefit of U.S. Provisional Application Ser. No. 60/733,405 filed on Nov. 4, 2005, entitled "Multiple Replication Levels with Pooled Devices" in the names of William H. Moore and Jeffrey S. Bonwick, which is hereby incorporated by reference.

The present application contains subject matter that may be related to the subject matter in the following U.S. patent applications, which are all assigned to a common assignee: "Method and Apparatus for Self-Validating Checksums in a File System" (application Ser. No. 10/828,573) filed on Apr. 24, 2004; "Method and Apparatus for Dynamic Striping" (application Ser. No. 10/828,677) filed on Apr. 21, 2004; "Method and Apparatus for Vectored Block-Level Checksum for File System Data Integrity" (application Ser. No. 10/828, 715) filed on Apr. 21, 2004; "Method and Apparatus for Identifying Tampering of Data in a File System" (application Ser. No. 10/853,874) filed on May 26, 2004; "Method and System for Detecting and Correcting Data Errors Using Checksums and Replication" (application Ser. No. 10/853, 837) filed on May 26, 2004; "Method and System for Detecting and Correcting Data Errors Using Data Permutations" (application Ser. No. 10/853,870) filed on May 26, 2004; "Method and Apparatus for Compressing Data in a File System" (application Ser. No. 10/853,868) filed on May 26, 2004; "Gang Blocks" (application Ser. No. 10/919,878) filed on Aug. 17, 2004; "Method and Apparatus for Enabling Adaptive Endianness" (application Ser. No. 10/919,886) filed on Aug. 17, 2004; "Automatic Conversion of All-Zero Data Storage Blocks into File Holes" (application Ser. No. 10/853, 915) filed on May 26, 2004; "Multiple Replication Levels with Pooled Devices" (Application Ser. No. 60/733,848) filed on Nov. 4, 2005; and "Method and System for Repairing Partially Damaged Blocks" (application Ser. No. 11/406,578) filed on Apr. 19, 2006.

BACKGROUND

A typical operating system includes a file system. The file system provides a mechanism for the storage and retrieval of files and a hierarchical directory structure for the naming of multiple files. More specifically, the file system stores information provided by the user (i.e., data) and information describing the characteristics of the data (i.e., metadata). The file system also provides extensive programming interfaces to enable the creation and deletion of files, reading and writing of files, performing seeks within a file, creating and deleting directories, managing directory contents, etc. In addition, the file system also provides management interfaces to create and delete file systems. File systems are typically controlled and restricted by operating system parameters. For example, most operating systems limit the maximum number of file names that can be handled within their file system. Some operating systems also limit the size of files that can be managed under a file system.

An application, which may reside on the local system (i.e., computer) or may be located on a remote system, uses files as an abstraction to address data. Conventionally, this data is stored on a storage device, such as a disk.

Data stored as files in a file system may be replicated using one or more replication schemes. Replication schemes are typically used to enable recover data in the event of file system failures, data corruption, etc. Data replication ensures continuous availability and protection of data stored on disk. The follow is a non-exclusive list of common replication schemes: redundant arrays of independent disks (RAID) schemes, 2-way mirroring, 3-way mirroring, etc. Typically, the level of granularity available for replication of data is a file.

There are many RAID schemes currently available. One common RAID scheme is RAID-5. In general, RAID-5 is used to replicate data across multiple physical disks organized in an array. More specifically, the physical disks in the data storage system are typically segmented into blocks of data space. A block may comprise any appropriate number of bytes of data (e.g., 512 bytes, 1024 bytes, etc.). In RAID-5, data to be stored is divided into data blocks and the resulting data blocks are XORed to obtain a parity block. The parity block corresponds to a block that is used to recover part of the data in the event that one of the aforementioned data blocks is corrupted or the disk, upon which the data block is stored, fails. The data blocks and the parity block are then written to the multiple disks by striping the data blocks across the multiple disks.

As discussed above, the parity block is used to reconstruct a block of data, if the block of data becomes corrupted or is not accessible (e.g., the disk upon which it is stored is offline). In such cases, the volume manager is notified that the disk has failed. Once the volume manager knows the disk has failed, it may then proceed to use the parity bit along with the other data blocks to reconstruct the corrupted data block.

SUMMARY

In general, in one aspect, the invention relates to a method for reconstructing corrupted data, comprising determining a number of non-parity disks (n), selecting a first combination of n-1 non-parity disks, obtaining a first set of physical blocks from the first combination of n-1 non-parity disks, obtaining a parity block associated with the first set of physical blocks, reconstructing a first physical block using the first set of physical blocks and the parity block, combining the first physical block and the first set of physical blocks to obtain a first reconstructed logical block, checksuming the first reconstructed logical block to obtain a first calculated checksum, and determining whether the first calculated checksum is equal to a stored checksum associated with the first reconstructed logical block.

In general, in one aspect, the invention relates to a computer readable medium with software instructions stored thereon to determine a number of non-parity disks (n), select a first combination of n-1 non-parity disks, obtain a first set of physical blocks from the first combination of n-1 non-parity disks, obtain a parity block associated with the first set of physical blocks, reconstruct a first physical block using the first set of physical blocks and the parity block, combine the first physical block and the first set of physical blocks to obtain a first reconstructed logical block, checksum the first reconstructed logical block to obtain a first calculated checksum, and determine whether the first calculated checksum is equal to a stored checksum associated with the first reconstructed logical block.

Other aspects of the invention will be apparent from the following description and the appended claims.

DETAILED DESCRIPTION

Figure 1:
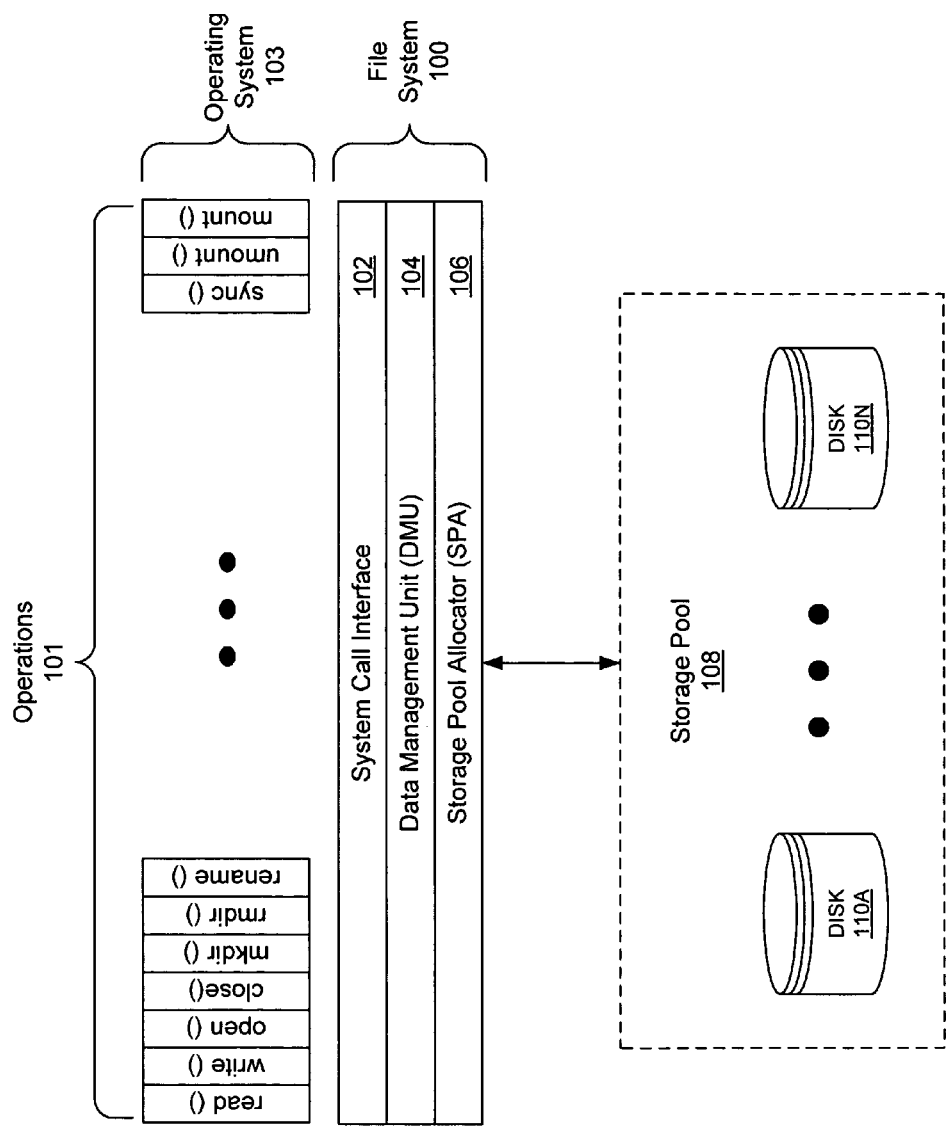
FIG. 1 shows a system architecture in accordance with an embodiment of the invention.

Specific embodiments of the invention will now be described in detail with reference to the accompanying figures. Like elements in the various figures are denoted by like reference numerals for consistency.

In the following detailed description of one or more embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention are directed to a method and system for repairing a corrupted block in a storage pool. More specifically, embodiments of the invention are directed to repairing silent data corruption in file systems implementing RAID schemes (e.g., RAID-5).

FIG. 1 shows a system architecture in accordance with one embodiment of the invention. The system architecture includes an operating system (103) interacting with a file system (100), which in turn interfaces with a storage pool (108). In one embodiment of the invention, the file system (100) includes a system call interface (102), a data management unit (DMU) (104), and a storage pool allocator (SPA) (106).

The operating system (103) typically interfaces with the file system (100) via a system call interface (102). The operating system (103) provides operations (101) for users to access files within the file system (100). These operations (101) may include read, write, open, close, etc. In one embodiment of the invention, the file system (100) is an object-based file system (i.e., both data and metadata are stored as objects). More specifically, the file system (100) includes functionality to store both data and corresponding metadata in the storage pool (108). Thus, the aforementioned operations (101) provided by the operating system (103) correspond to operations on objects.

More specifically, in one embodiment of the invention, a request to perform a particular operation (101) (i.e., a transaction) is forwarded from the operating system (103), via the system call interface (102), to the DMU (104). In one embodiment of the invention, the DMU (104) translates the request to perform an operation on an object directly to a request to perform a read or write operation at a physical location within the storage pool (108). More specifically, the DMU (104) represents the objects as data blocks and indirect blocks as described in FIG. 3 below. Additionally, in one embodiment of the invention, the DMU (104) includes functionality to group related work (i.e., modifications to data blocks and indirect blocks) into I/O requests allowing related blocks to be forwarded to the SPA (106) together. The SPA (106) receives transactions from the DMU (106) and subsequently writes the blocks into the storage pool (108). The operation of the SPA (106) is described in FIG. 2 below.

In one embodiment of the invention, the storage pool (108) includes one or more physical disks (disks (110A-110N)). Further, in one embodiment of the invention, the storage capacity of the storage pool (108) may increase and decrease dynamically as physical disks are added and removed from the storage pool. In one embodiment of the invention, the storage space available in the storage pool (108) is managed by the SPA (106).

Figure 2:
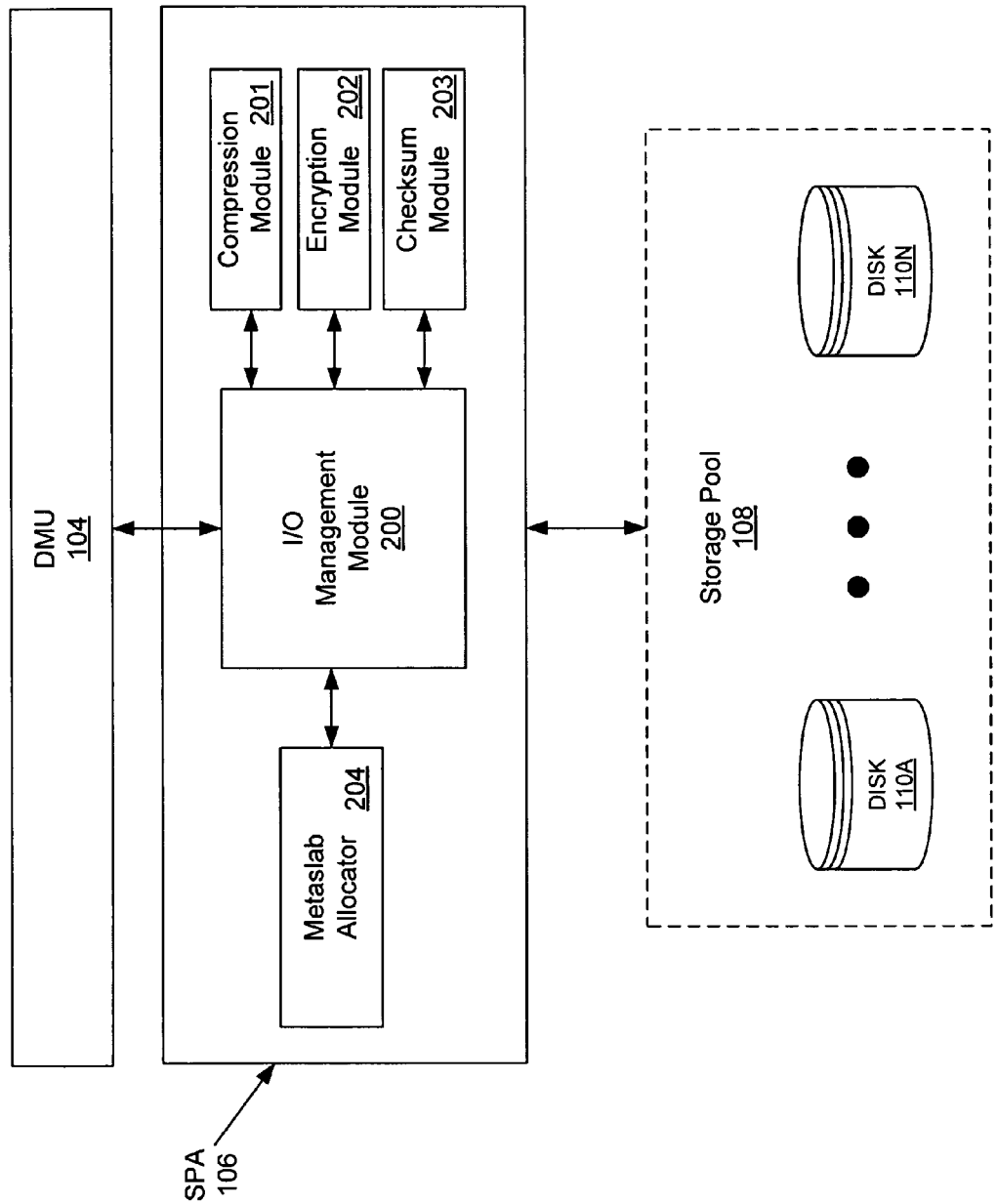
FIG. 2 shows a storage pool allocator in accordance with an embodiment of the invention.

FIG. 2 shows the SPA (106) in accordance with one embodiment of the invention. The SPA (106) may include an I/O management module (200), a compression module (201), an encryption module (202), a checksum module (203), and a metaslab allocator (204). Each of these aforementioned modules in detail below.

As noted above, the SPA (106) receives transactions from the DMU (104). More specifically, the I/O management module (200), within the SPA (106), receives transactions from the DMU (104) and groups the transactions into transaction groups in accordance with one embodiment of the invention. The compression module (201) provides functionality to compress larger logical blocks (i.e., data blocks and indirect blocks) into smaller segments, where a segment is a region of physical disk space. For example, a logical block size of 8K bytes may be compressed to a size of 2K bytes for efficient storage. Further, in one embodiment of the invention, the encryption module (202) provides various data encryption algorithms. The data encryption algorithms may be used, for example, to prevent unauthorized access. In one embodiment of the invention, the checksum module (203) includes functionality to calculate a checksum for data (i.e., data stored in a data block) and metadata (i.e., data stored in an indirect block) within the storage pool. The checksum may be used, for example, to ensure data has not been corrupted.

As discussed above, the SPA (106) provides an interface to the storage pool and manages allocation of storage space within the storage pool (108). More specifically, in one embodiment of the invention, the SPA (106) uses the metaslab allocator (204) to manage the allocation of storage space in the storage pool (108).

In one embodiment of the invention, the storage space in the storage pool is divided into contiguous regions of data, i.e., metaslabs. The metaslabs may in turn be divided into segments (i.e., portions of the metaslab). The segments may all be the same size, or alternatively, may be a range of sizes. The metaslab allocator (204) includes functionality to allocate large or small segments to store data blocks and indirect blocks. In one embodiment of the invention, allocation of the segments within the metaslabs is based on the size of the blocks within the I/O requests. That is, small segments are allocated for small blocks, while large segments are allocated for large blocks. The allocation of segments based on the size of the blocks may allow for more efficient storage of data and metadata in the storage pool by reducing the amount of unused space within a given metaslab. Further, using large segments for large blocks may allow for more efficient access to data (and metadata) by reducing the number of DMU (104) translations and/or reducing the number of I/O operations. In one embodiment of the invention, the metaslab allocator may include a policy that specifies a method to allocate segments.

As noted above, the storage pool (108) is divided into metaslabs, which are further divided into segments. Each of the segments within the metaslab may then be used to store a data block (i.e., data) or an indirect block (i.e., metadata).

Figure 3:
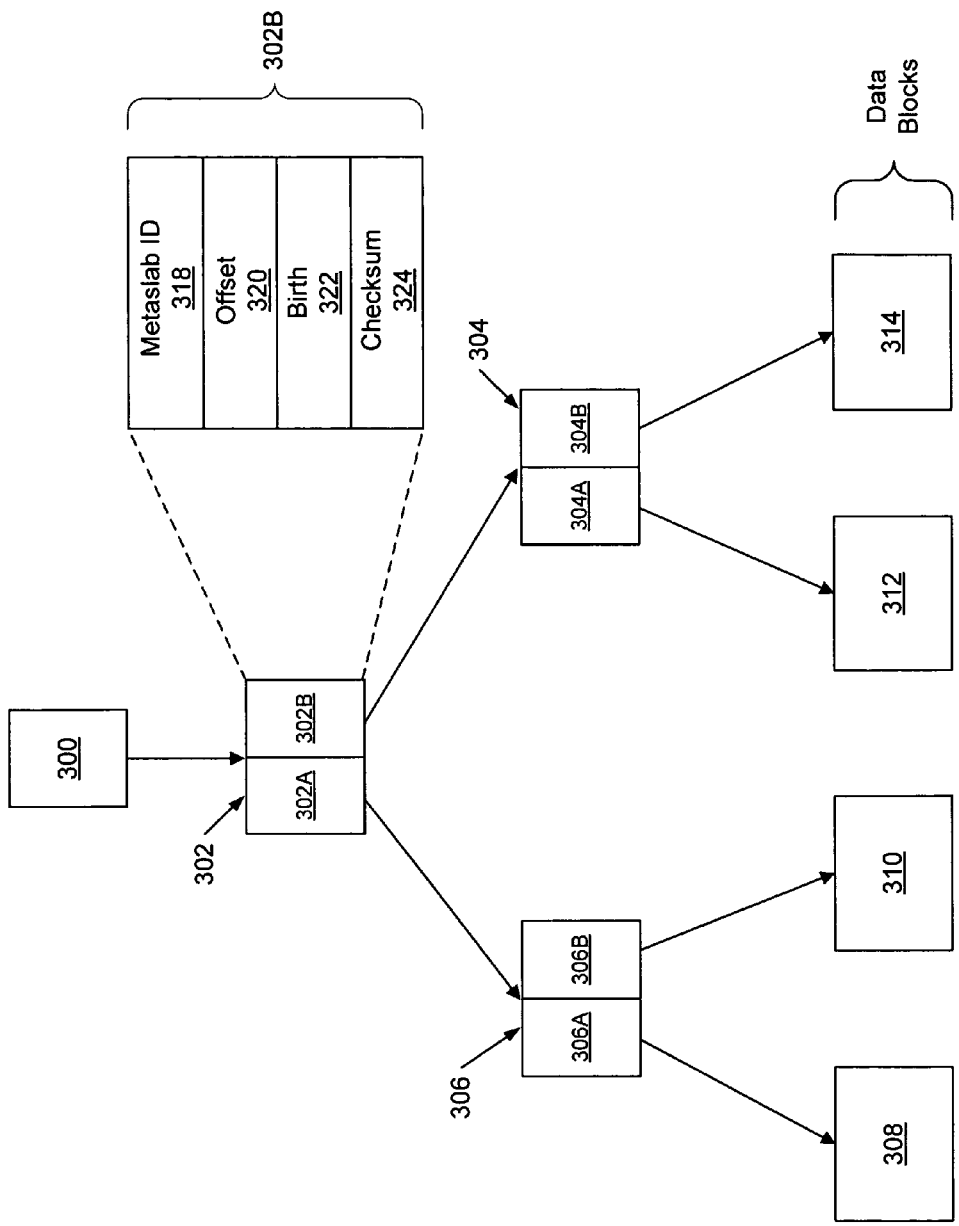
FIG. 3 shows a hierarchical data configuration in accordance with an embodiment of the invention.

FIG. 3 shows the hierarchical data configuration (hereinafter referred to as a "tree") for storing data blocks and indirect blocks within the storage pool in accordance with one embodiment of the invention. In one embodiment of the invention, the tree includes a root block (300), one or more levels of indirect blocks (302, 304, 306), and one or more data blocks (308, 310, 312, 314). In one embodiment of the invention, the location of the root block (300) is in a particular location within the storage pool. The root block (300) typically points to subsequent indirect blocks (302, 304, and 306). In one embodiment of the invention, indirect blocks (302, 304, and 306) may be arrays of block pointers (e.g., 302A, 302B, etc.) that, directly or indirectly, reference to data blocks (308, 310, 312, and 314). The data blocks (308, 310, 312, and 314) contain actual data of files stored in the storage pool. One skilled in the art will appreciate that several layers of indirect blocks may exist between the root block (300) and the data blocks (308, 310, 312, 314).

In contrast to the root block (300), indirect blocks and data blocks may be located anywhere in the storage pool (108 in FIG. 1). In one embodiment of the invention, the root block (300) and each block pointer (e.g., 302A, 302B, etc.) includes data as shown in the expanded block pointer (302B). One skilled in the art will appreciate that data blocks do not include this information; rather data blocks contain actual data of files within the file system.

In one embodiment of the invention, each block pointer includes a metaslab ID (318), an offset (320) within the metaslab, a birth value (322) of the block referenced by the block pointer, and a checksum (324) of the data stored in the block (data block or indirect block) referenced by the block pointer. In one embodiment of the invention, the metaslab ID (318) and offset (320) are used to determine the location of the block (data block or indirect block) in the storage pool. The metaslab ID (318) identifies a particular metaslab. More specifically, the metaslab ID (318) may identify the particular disk (within the storage pool) upon which the metaslab resides and where in the disk the metaslab begins. The offset (320) may then be used to reference a particular segment in the metaslab.

In one embodiment of the invention, the data within the segment referenced by the particular metaslab ID (318) and offset (320) may correspond to either a data block or an indirect block. If the data corresponds to an indirect block, then the metaslab ID and offset within a block pointer in the indirect block are extracted and used to locate a subsequent data block or indirect block. The tree may be traversed in this manner to eventually retrieve a requested data block.

In one embodiment of the invention, copy-on-write transactions are performed for every data write request to a file. Specifically, all write requests cause new segments to be allocated for the modified data. Therefore, the retrieved data blocks and indirect blocks are never overwritten (until a modified version of the data block and indirect block is committed). More specifically, the DMU writes out all the modified data blocks in the tree to unused segments within the storage pool. Subsequently, the DMU writes out the corresponding block pointers (within indirect blocks) to unused segments in the storage pool. In one embodiment of the invention, fields (i.e., metaslab ID, offset, birth, checksum) for the corresponding block pointers are populated by the DMU prior to sending an I/O request to the SPA. The indirect blocks containing the block pointers are typically written one level at a time. To complete the copy-on-write transaction, the SPA issues a single write that atomically changes the root block to reference the indirect blocks referencing the modified data block.

Figure 4:
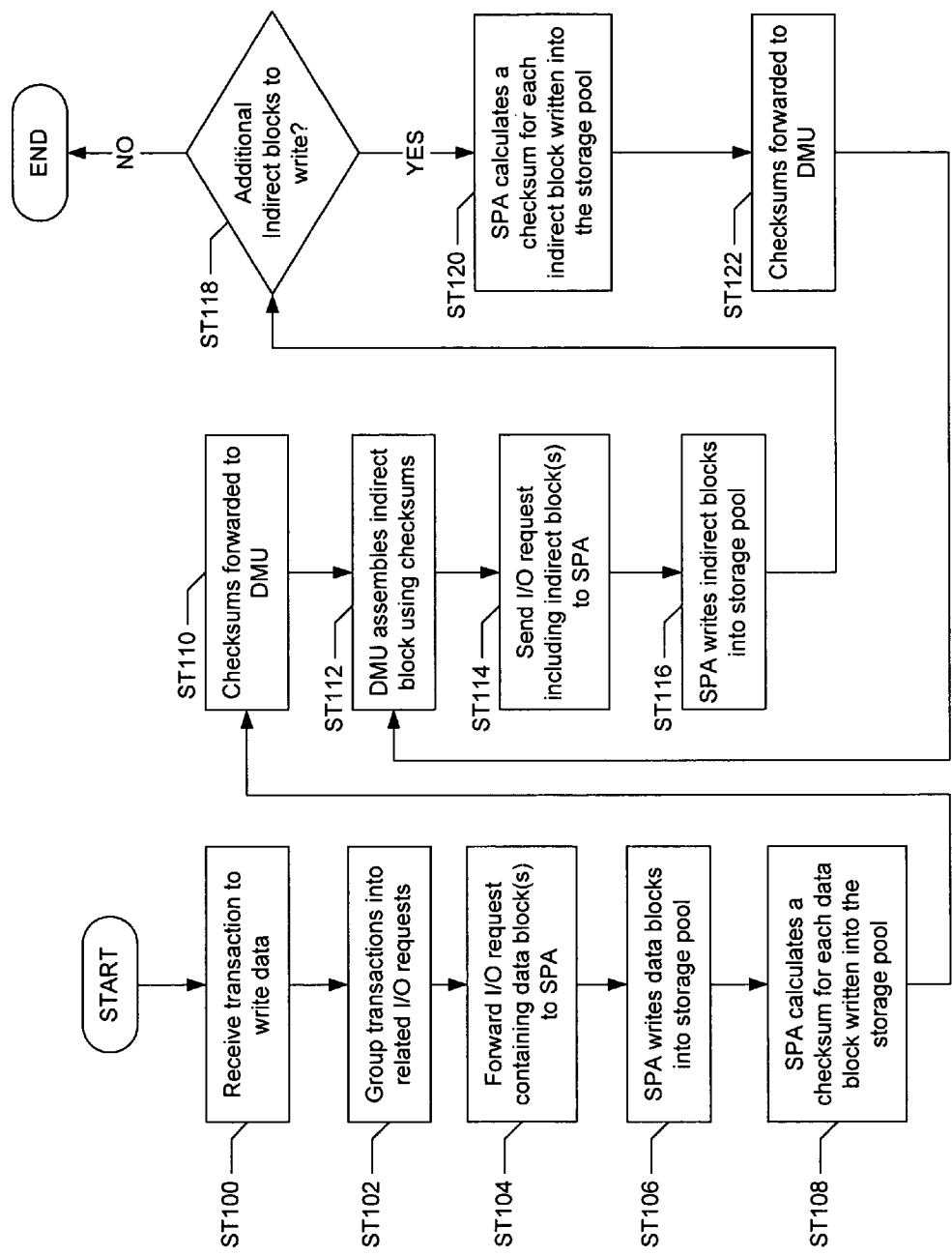
FIGS. 4-6 show flow charts in accordance with an embodiment of the invention.

Using the infrastructure shown in FIGS. 1-3, the following discussion describes a method for implementing a self-validating checksum in accordance with one embodiment of the invention. FIG. 4 shows a flow chart in accordance with one embodiment of the invention. Initially, the DMU receives a transaction from an application, the operating system (or a subsystem therein), etc. (ST 100). The DMU subsequently groups the transaction into one or more I/O requests (ST 102). The I/O requests are subsequently forwarded to the SPA (ST 104).

In one embodiment of the invention, the transaction includes one or more data blocks, and/or one or more indirect blocks. As noted above, the file system is stored on disk using a hierarchical structure including data blocks and indirect blocks. Thus, for a given set of transactions, the first I/O request includes the data blocks to be written to disk, while subsequent I/O requests include the corresponding indirect blocks containing one or more block pointers. Accordingly, I/O request referenced in ST 104 includes data blocks.

Continuing with the discussion of FIG. 4, the SPA, upon receiving the I/O request including data blocks from the DMU, writes the data blocks into the storage pool (ST 106). In one embodiment of the invention, the SPA may store the data block in the storage pool in accordance with a replication scheme (e.g., RAID 5, mirroring, etc.). The SPA subsequently calculates a checksum for each data block written into the storage pool (ST 108). In one embodiment, the checksum module (203 in FIG. 2) within the SPA is used to calculate the checksum for each data block written into the storage pool. The checksums are subsequently forwarded to the DMU (ST 110). The DMU then assembles the indirect blocks using the checksums (ST 112). Specifically, the DMU places the checksum for a given data block in the appropriate block pointer within the indirect block (i.e., the parent indirect block of the data block). Next, the indirect blocks are forwarded to the SPA (ST 114). Those skilled in the art will appreciate that the aforementioned indirect blocks correspond to the indirect blocks that directly point (via the block pointers) to the data blocks (as opposed to indirect blocks that point to other indirect blocks).

Next, the SPA receives and subsequently writes the indirect blocks into the storage pool (ST 116). In one embodiment of the invention, the SPA may store the indirect block in the storage pool in accordance with a replication scheme (e.g., RAID 5, mirroring, etc.). A determination is then made whether additional indirect blocks exist to write into the storage pool (i.e., whether the last indirect block written to the storage pool corresponds to the root block) (ST 118). If no additional indirect blocks exist, then the method is complete. However, if additional indirect blocks exist, then the SPA calculates the checksum from each of the indirect blocks written into the storage pool (ST 120). The checksums for each of the indirect blocks is subsequently forwarded to the DMU (ST 122). Steps ST 112 through ST 122 are subsequently repeated until the root block is written into the storage pool.

Figure 5:
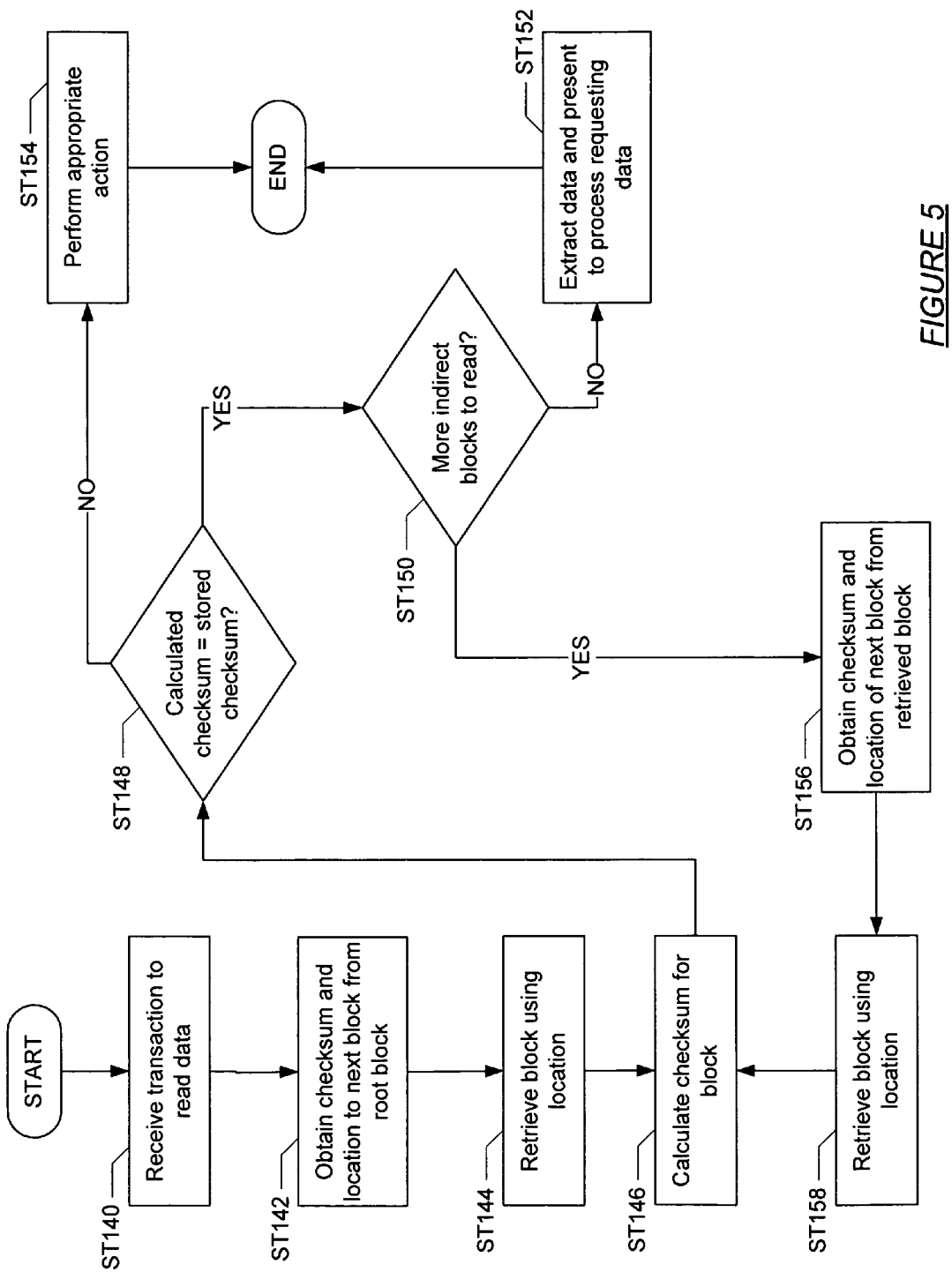

FIG. 5 shows a flow chart in accordance with one embodiment of the invention. More specifically, FIG. 5 details a method for reading data in accordance with one embodiment of the invention. Initially, a transaction to read data is received (ST 140). A checksum and a location to the next block (i.e., a data block or an indirect block) stored in the root block are subsequently retrieved (ST 142). The location (e.g., the metaslab ID and offset) is subsequently used to obtain the block (i.e., the data block or the indirect block) (ST 144). The checksum of the retrieved block is then calculated (ST 146). A determination is subsequently made whether the stored checksum is equal to the calculated checksum (ST 148). If the stored checksum is not equal to the calculated checksum, then an appropriate action is performed (e.g., an error message is generated indicating that the data is corrupted and/or an attempt to repair the corrupted block is initiated (see FIG. 5)) (ST 154).

If the stored checksum is equal to the calculated checksum, then a determination is made whether the retrieved block is a data block (ST 150). If the retrieved block is a data block, then the data is extracted from the data block and presented to the process requesting the data (ST 152). Alternatively, if the retrieved block is not the data block, then the location of the next block (stored within a block pointer within the retrieved block) is obtained (ST 156). The block (data block or indirect block) at the location is subsequently obtained (ST 158). Steps ST 146 through ST 154 are subsequently repeated until either data corruption is encountered (i.e., ST 148) or the data block is encountered (i.e., ST 152).

Figure 6:
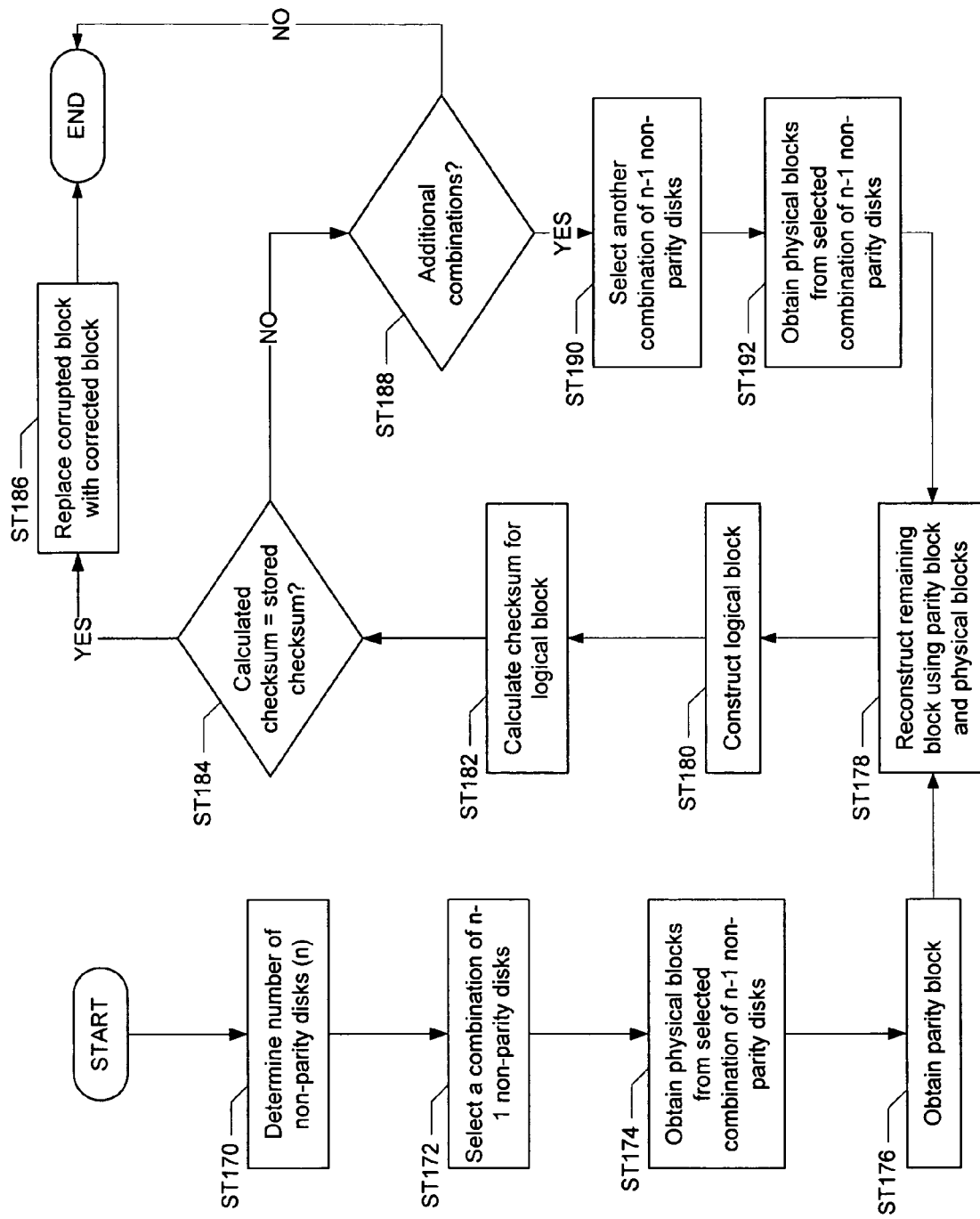

FIG. 6 shows a flowchart in accordance with one embodiment of the invention. More specifically, FIG. 6 is directed to repairing (or at least attempting to repair) a corrupted block (e.g., a data block, an indirect block, or a root block), where the block was stored using a RAID scheme (e.g., RAID-5). As discussed above, the file system may determine that a given block is corrupted when the stored checksum of the block is not equal to the calculated checksum of block (see FIG. 5 above).

Further, as discussed above, the checksums are generated on a per-block basis (hereinafter a "logical block" (e.g., 306, 308, etc. in FIG. 3)). For example, if the storage pool is implementing a RAID scheme and a 2K data block is to be stored, then the data block may be divided in four 512 byte (physical blocks), where each of the physical blocks is stored on a separate disk in the storage pool. Further, a parity block, generated using the four aforementioned physical blocks, is also stored in the storage pool on a separate disk. The checksum is calculated on a per-block basis, thus, there is a checksum for the entire 2K data block, but not an individual checksum for each of the physical blocks.

Returning to FIG. 6, FIG. 6 is directed to determining which of the physical blocks, which make up the logical block, is corrupted when the checksum calculated for the logical block (e.g., the 2K data block ) is not equal to the stored checksum (i.e., the checksum stored in a block pointer referencing the 2K data block).

Turning the FIG. 6, initially, a determination is made about the number of non-parity disks (n) used to store the logical block (ST170). For example, in a RAID-5 implementation four non-parity disks are used. A combination of n-1 non-parity disks is then selected (ST172). For example, disks 1, 2, 3 out of disks 0-3 are selected. The physical blocks stored on the selected n-1 disks are subsequently obtained (e.g., the physical blocks from disks 1-3 are obtained) (ST174). The corresponding parity block (i.e., the physical block on the parity disk) is then obtained (ST176).

The remaining physical block (e.g., physical block on disk 0) is reconstructed from the physical blocks retrieved in ST174 and the parity block retrieved in ST176 using techniques known in the art (e.g., using an XOR function if storage pool uses RAID-5) (ST178). The logical block is then constructed using the physical blocks and the reconstructed block (ST180). A checksum is then calculated for the logical block (ST182). The calculated checksum is then compared to the stored checksum (ST184).

If the calculated checksum is equal to the stored checksum, then the corrupted physical block (e.g., physical block on disk 0) is replaced with the correct physical block (i.e., the reconstructed block) (ST186) and the process ends. Alternatively, if the checksum is not equal to the stored checksum, then a determination is made about whether there are any remaining combinations of non-parity disks to evaluate (ST188). If no remaining combinations exist, then the process ends and the physical block cannot be repaired.

However, if additional combinations exist, then another combination of n-1 non-parity disks is selected (ST190) and the physical blocks from these disks are obtained (ST192). At this stage, the process then proceeds to ST178.

Those skilled in the art will appreciate that the flowchart shown in FIG. 6 is directed to a RAID-5 implementation. Accordingly, because RAID-5 can only recover from a single corrupted block, if multiple blocks are corrupted then the method shown in FIG. 1 may not be appropriate to correct the corrupted data.

However, other schemes such as RAID-6 can recover from multiple block corruptions. In such cases, the method shown in FIG. 6 may be modified to evaluate combinations of non-parity (or equivalent) disks where the number of disks in the combination corresponds to n-(number of block tolerated) (i.e., 2 in RAID-6).

Figure 7:
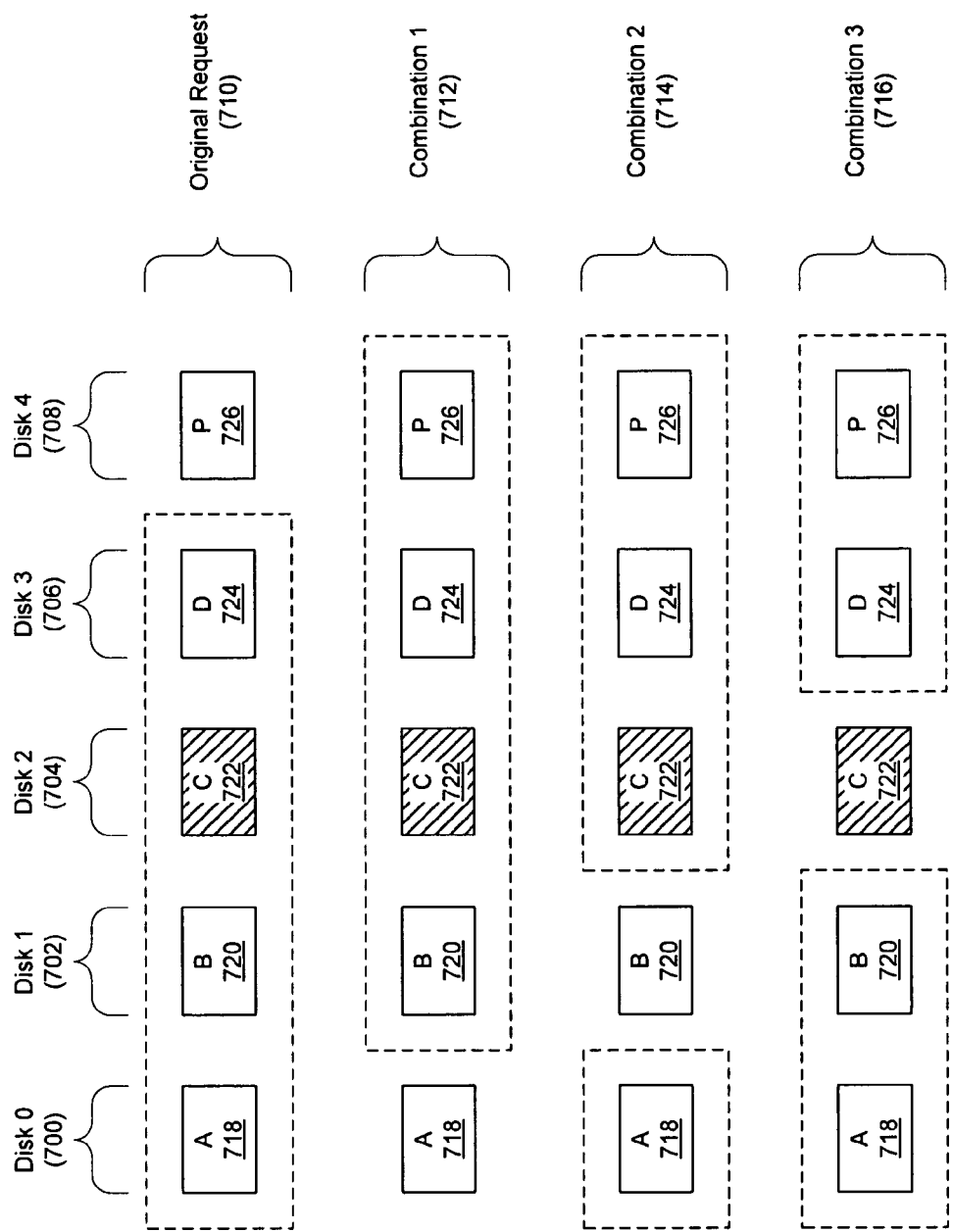
FIG. 7 shows a block diagram in accordance with one embodiment of the invention.

FIG. 7 shows a block diagram in accordance with one embodiment of the invention. More specifically, FIG. 7 shows an example of how the method shown in FIG. 6 (and described above) may be used to correct a corrupted physical block. As shown in FIG. 7, the system includes five disks (disk 0 (700), disk 1 (702), disk 2 (704), disk 3 (706), disk 4 (708)) implementing RAID-5. Further, for the purposes of the example, assume the logical block is a 2K block and it was stored using RAID-5, where each of the physical blocks is 512 bytes. Further, assume that physical blocks A-D (718, 720, 722, 724) are initially retrieved by the file system (710) and that physical block C (722) is corrupted. Because, physical block C (722) is corrupted, when physical blocks A-D (718, 720, 722, 724) are combined to obtain the logical block, and a checksum is performed on the logical block, the calculated checksum is not equal to the stored checksum. In one or more embodiments of the invention, the failure of the checksum initiates the method shown in FIG. 6.

In accordance with the method shown in FIG. 6, three of the four non-parity disks are selected (i.e., combination 1 (712)) and the corresponding physical blocks from those disks are retrieved (e.g., physical blocks B (720), C (722), and D (724)). In addition, the corresponding parity block (726) is also retrieved (i.e., physical block P (726)). The parity block P (726) along with physical blocks B (720), C (722), and D (724) are subsequently used to reconstruct physical block A (718). Reconstructed physical block A (718) is then combined with physical blocks B (720), C (722), and D (724) to obtain the corresponding logical block. The logical block is subsequently checksumed. Because physical block C (722) is corrupted, the resulting checksum is not correct.

In accordance with ST114, the physical blocks in combination 2 (714) are subsequently retrieved (i.e., physical block A (718), C (722), D (724), and P (726)). The retrieved physical blocks are then used to reconstruct physical block B (720). Reconstructed physical block B is then combined with physical blocks A (718), C (722), and D (724) to obtain the corresponding logical block. A checksum is subsequently performed on the logical block. Because physical block C (722) is corrupted, the resulting checksum is not correct.

In accordance with ST114, the physical blocks in combination 3 (716) are subsequently retrieved (i.e., physical block A (718), B (720), D (724), and P (726)). The retrieved physical blocks are then used to reconstruct physical block C. Reconstructed physical block C is then combined with physical blocks A (718), B (720), and D (724) to obtain the corresponding logical block. A checksum is subsequently performed on the logical block. In this case, because physical block C was reconstructed, reconstructed physical block C is not corrupted and the resulting checksum is correct. At this stage, corrupted physical block C may be replaced with reconstructed physical block C. In addition, all the physical blocks are now correct and may be forwarded to the requesting application, process, etc.

Figure 8:
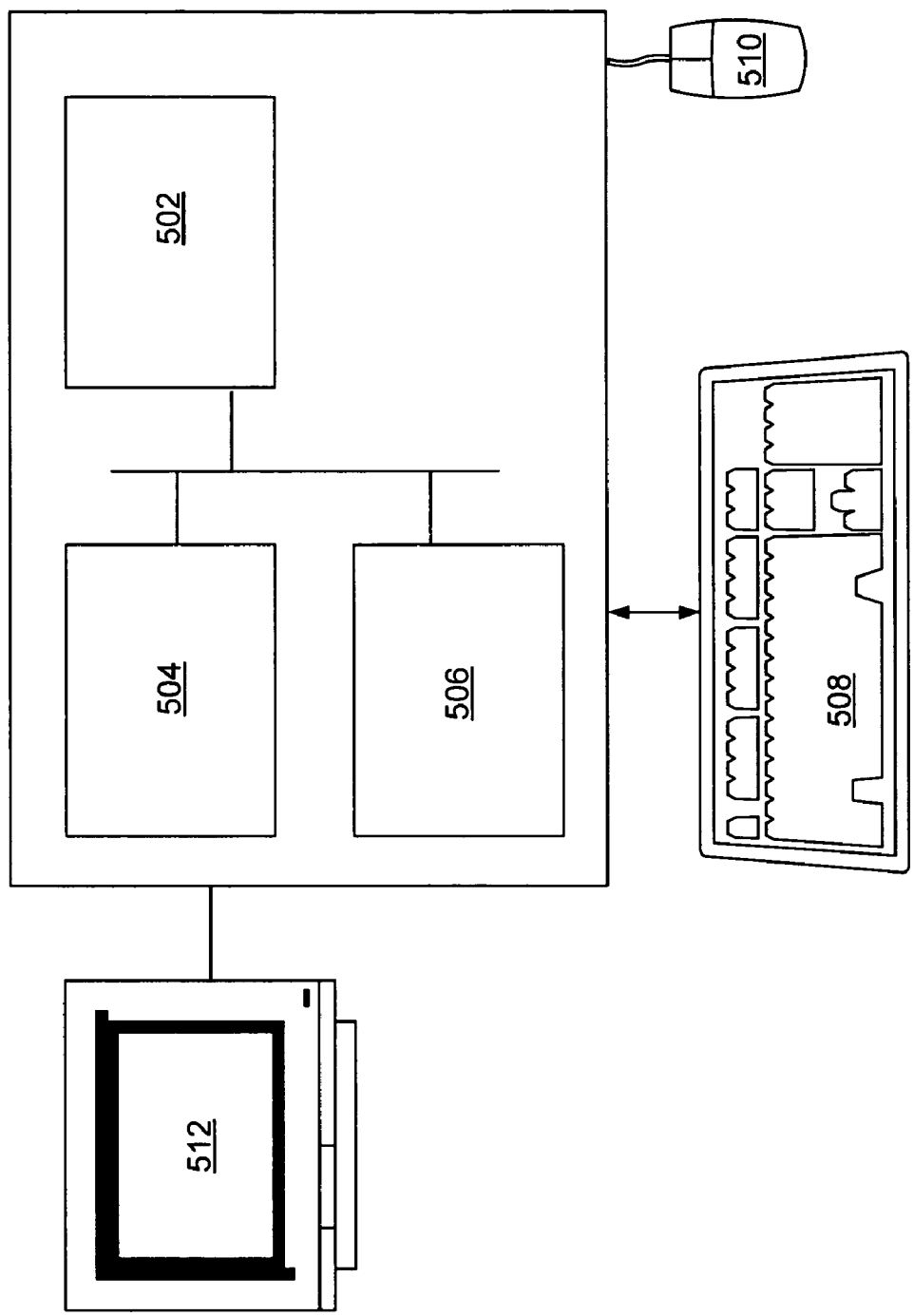
FIG. 8 shows a computer system in accordance with an embodiment of the invention.

The invention may be implemented on virtually any type of computer regardless of the platform being used. For example, as shown in FIG. 8, a networked computer system (500) includes a processor (502), associated memory (504), a storage device (506), and numerous other elements and functionalities typical of today's computers (not shown). The networked computer (500) may also include input means, such as a keyboard (508) and a mouse (510), and output means, such as a monitor (512). The networked computer system (500) is connected to a local area network (LAN) or a wide area network (e.g., the Internet) (not shown) via a network interface connection (not shown). Those skilled in the art will appreciate that these input and output means may take other forms. Further, those skilled in the art will appreciate that one or more elements of the aforementioned computer (500) may be located at a remote location and connected to the other elements over a network.

Software instructions to perform embodiments of the invention may be stored on a computer readable medium such as a compact disc (CD), a diskette, a tape, or any other tangible computer readable storage device.

Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer readable medium with software instructions stored thereon to:
   determine a number of non-parity disks (n);
   select a first combination of n-1 non-parity disks;
   obtain a first set of physical blocks from the first combination of n-1 non-parity disks;
   obtain a parity block associated with the first set of physical blocks;
   reconstruct a first physical block using the first set of physical blocks and the parity block;
   combine the first physical block and the first set of physical blocks to obtain a first reconstructed logical block;
   checksum the first reconstructed logical block to obtain a first calculated checksum; and
   determine whether the first calculated checksum is equal to a stored checksum associated with the first reconstructed logical block.

2. The computer readable medium of claim 1, further comprising software instructions to: replace a corresponding physical block in a storage pool with the first physical block, if the first calculated checksum is equal to the stored checksum associated with the logical block.

3. The computer readable medium of claim 1, further comprising software instructions to: if the first calculated checksum is not equal to the stored checksum associated with the logical block: select a second combination of n-1 non-parity disks; obtain a second set of physical blocks from the second combination of n-1 non-parity disks; reconstruct a second physical block using the second set of physical blocks and the parity block; combine the second physical block and the second set of physical blocks to obtain a second reconstructed logical block; checksum the second reconstructed logical block to obtain a second calculated checksum; and determine whether the second calculated checksum is equal to a stored checksum associated with the second reconstructed logical block.

4. The computer readable medium of claim 1, wherein the stored checksum is stored in a block pointer referencing the logical block.

5. The computer readable medium of claim 1, wherein the logical block is stored using a RAID scheme.

6. The computer readable medium of claim 1, wherein the logical block is a data block.

7. The computer readable medium of claim 1, wherein the logical block is an indirect block.

8. The computer readable medium of claim 1, wherein the logical block is associated with a file.

9. A system, comprising: a processor; and a computer usable storage medium having computer readable program code embodied therein, the computer readable program code adapted to, when executed by the processor, implements a method, the method comprising: determining a number of non-parity disks (n); selecting a first combination of n-1 non-parity disks; obtaining a first set of physical blocks from the first combination of n-1 non-parity disks; obtaining a parity block associated with the first set of physical blocks; reconstructing a first physical block using the first set of physical blocks and the parity block; combining the first physical block and the first set of physical blocks to obtain a first reconstructed logical block; checksuming the first reconstructed logical block to obtain a first calculated checksum; and determining whether the first calculated checksum is equal to a stored checksum associated with the first reconstructed logical block.

10. The system of claim 9, the method further comprising: replacing a corresponding physical block in a storage pool with the first physical block, if the first calculated checksum is equal to the stored checksum associated with the logical block.

11. The system of claim 9, the method further comprising: if the first calculated checksum is not equal to the stored checksum associated with the logical block: selecting a second combination of n-1 non-parity disks; obtaining a second set of physical blocks from the second combination of n-1 non-parity disks; reconstructing a second physical block using the second set of physical blocks and the parity block; combining the second physical block and the second set of physical blocks to obtain a second reconstructed logical block; checksuming the second reconstructed logical block to obtain a second calculated checksum; and determining whether the second calculated checksum is equal to a stored checksum associated with the second reconstructed logical block.

12. The system of claim 9, wherein the stored checksum is stored in a block pointer referencing the logical block.

13. The system of claim 9, wherein the logical block is stored using a RAID scheme.

14. The system of claim 9, wherein the logical block is a data block.

15. The system of claim 9, wherein the logical block is an indirect block.

16. The system of claim 9, wherein the logical block is associated with a file.

* * * * *